F. HOFFMAN.
ENGINE STARTER.
APPLICATION FILED JAN. 11, 1916.
1,251,523.
Patented Jan. 1, 1918.
2 SHEETS—SHEET 1.
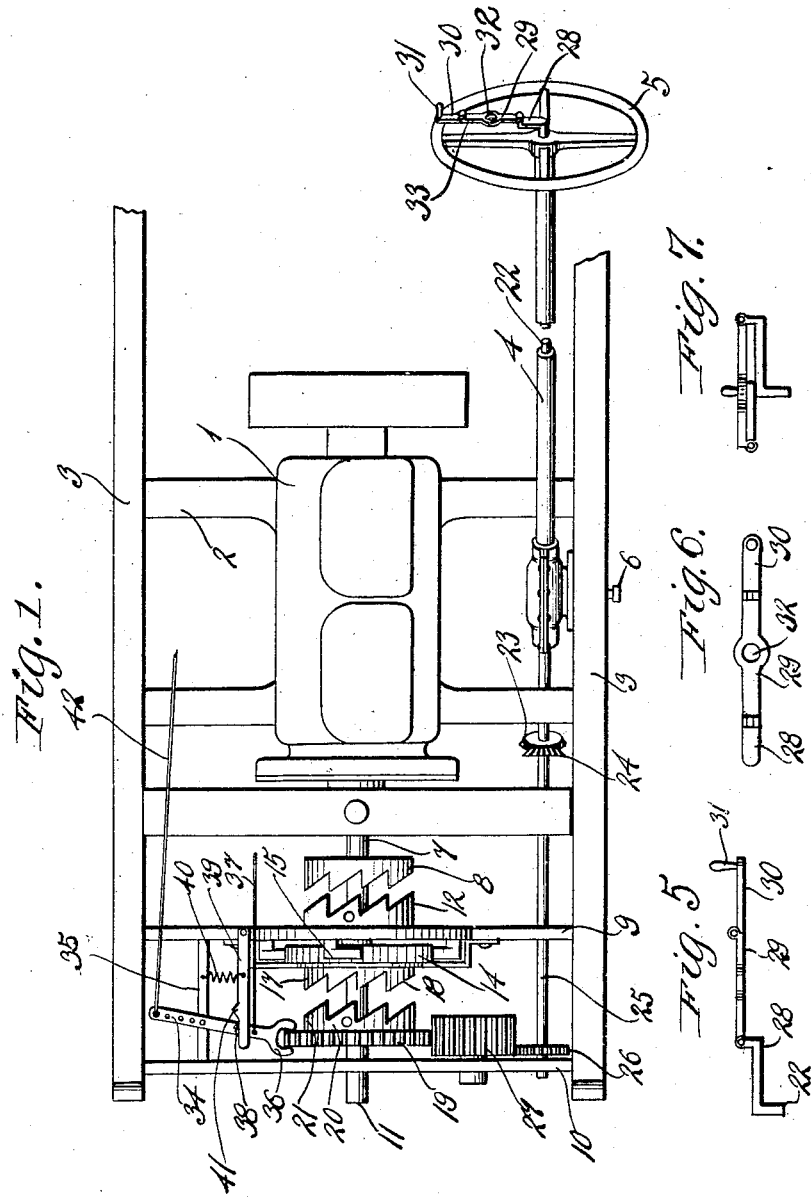
INVENTOR
Frank Hoffman.
WITNESSES
Guy M. Spring.
Lloyd W. Patch.
BY Richard Owen.
ATTORNEY F. HOFFMAN.
ENGINE STARTER.
APPLICATION FILED JAN. 11, 1916.
1,251,523.
Patented Jan. 1, 1918.
2 SHEETS—SHEET 2.
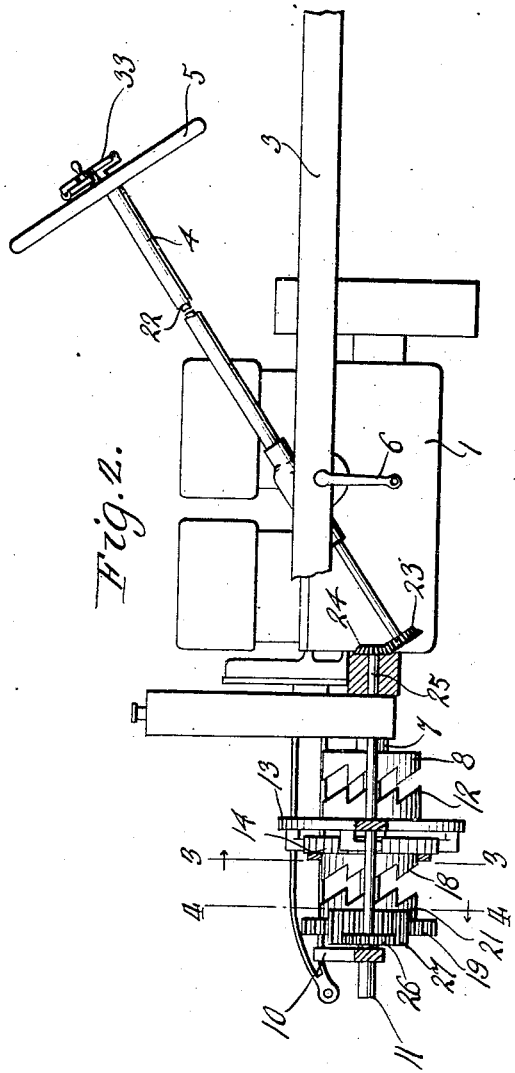
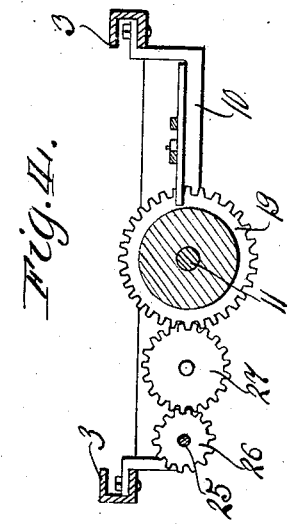
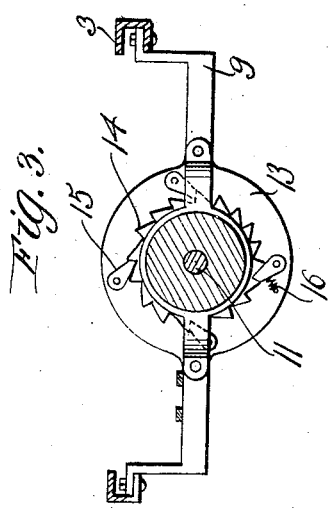
INVENTOR
Frank Hoffman.
WITNESSES
BY

UNITED STATES PATENT OFFICE.

FRANK HOFFMAN, OF SORUM, SOUTH DAKOTA.

ENGINE-STARTER.

1,251,523.     Specification of Letters Patent.     Patented Jan. 1, 1918.

Application filed January 11, 1916. Serial No. 71,552.

*To all whom it may concern:*

Be it known that I, FRANK HOFFMAN, a citizen of the United States, residing at Sorum, in the county of Perkins and State of South Dakota, have invented certain new and useful Improvements in Engine-Starters, of which the following is a specification.

An object of my invention is to provide a motor starter which may be fitted to and used in connection with the motor of an automobile, a truck, a motor boat, or in any other connection where a steering action is accomplished to direct the course of travel of the vehicle in which the motor is installed as the propelling power, and which starting device is so arranged that the motor may be started from the driving or steering seat without great effort on the part of the operator, and by the use of one hand which will leave the other hand free to grasp the steering wheel or to operate the brake levers or other parts.

A further object is to so construct the parts that the device may be thrown into and out of operative relation at the will of the operator and as the motor backfires, the parts are automatically moved to the inoperative relation and the engine shaft is free to have movement independently of the starter mechanism, thus eliminating the possibility of injury to the operator or the mechanical structure.

With these and other objects in view, my invention consists of certain novel features of construction, and combinations of parts which will be hereinafter more fully set forth in connection with the accompanying drawings and then pointed out in the claims.

In the drawings:

Figure 1 is a diagrammatic view in plan of the forward portion of an automobile with my invention applied thereon.

Fig. 2 is a view in side elevation of the disclosure in Fig. 1.

Fig. 3 is a transverse sectional view taken on the line 3—3 of Fig. 2.

Fig. 4 is a transverse sectional view taken on the line 4—4 of Fig. 2 in the direction of the arrow.

Fig. 5 is a view in side elevation of the starting handle.

Fig. 6 is a view in top plan of the disclosure in Fig. 5.

Fig. 7 is a view similar to Fig. 5 but showing the parts in their folded relation.

In the adaptation of the invention as illustrated in the drawings, the motor 1 is mounted on the cross bars 2 which are disposed between the side members 3 of the main frame of the vehicle and it is of course understood that the frame 3 will be carried by suitable axles on which the wheels are mounted and that the steering of the vehicle will be accomplished in the usual manner through the turning of the front wheels. A steering post 4 is mounted on the frame and is extended to a position that the steering wheel 5 connected therewith is within the easy grasp of the operator, and any sort of a steering connection may be arranged from the arm 6 which is swung by the turning of the steering wheel 5. The engine shaft 7 is extended beyond the forward bearing within the crank case and a toothed clutch member 8 is secured on the outer end of this shaft 7 with the teeth thereof arranged so that turning movement may be imparted to the shaft 7 in a clockwise direction or in the usual direction of turning of a motor shaft.

The supporting members 9 and 10 are mounted across the frame forwardly of the mounting of the engine and a starter shaft 11 is journaled in bearings provided in the cross members 9 and 10 and is also mounted to be capable of endwise sliding movement. A clutch member 12 is mounted on the inner end of this starter shaft 11 and has teeth formed to mesh with the teeth of the clutch member 8 as the starter shaft 11 is moved inwardly to a sufficient extent, this shaft 11, being mounted in alinement with the motor shaft 7.

The cross member 9 is widened out as at 13 around the bearing in which the starter shaft 11 is journaled and a ratchet wheel 14 is revolubly mounted on the shaft 11. The ratchet teeth of the wheel 14 are faced toward the left so that this wheel may have turning movement in a clockwise direction and a plurality of dogs 15 are carried by the enlarged portion 13 of the cross member 9 and are held by the springs 16 in a relation that they engage with the teeth of the ratchet wheel 14 to prevent back movement thereof. A sleeve 17 is provided to project forwardly from the face of the ratchet wheel 14 and is provided with cam surfaces at 18 on the outer end thereof. A gear wheel 19 has a sleeve 20 formed to extend inwardly therefrom and provided with cam faces 21 which will fit the cam faces 18 of the sleeve 17, and this gear wheel is rigidly mounted on the starter shaft 11 so that as the wheel may be shifted the shaft will be carried therewith and will be moved endwise through its bearing in the cross members 9 and 10 and also through the central opening of the ratchet wheel 14.

A starter shaft 22 is extended down through the steering post 4 and at its lower end has a miter gear 23 which meshes with the miter gear 24 connection on the shaft 25 which is mounted through the cross pieces 9 and 10 to be capable of revoluble movement. A gear wheel 26 is mounted on the outer end of the shaft 25 and has mesh with a wide gear wheel 27 which is also in mesh with the gear wheel 19. By connecting the parts in this manner, as turning movement is given to the shaft 22, this movement is transmitted to the gear wheel 19 and through the fact that this gear wheel is secured on the starter shaft 11, the starter shaft will also be rotated. A crank arm 28 is borne on the outer end of the operating shaft 22 and has one member of a hinged joint provided on the end thereof. A second member 29 is hinged to the crank member 28 and at its free end has one member of a hinged joint in which the handle member 30 is hinged. A handle 31 is carried by the handle member 30, and an opening 32 is provided through the body of the member 29 so that as the handle member 30 is folded against the member 29, the handle 31 will be received through this orifice 32 and then the member 29 will also be folded so that the parts will occupy a position of rest against the crank portion 28 and thus the starting handle generally designated by the reference character 33 will be folded to a relation that it will be entirely out of the path of movement of the hand of the operator in swinging the steering wheel 5.

A forked shifting lever 34 is mounted on a frame member 35 which is connected between the cross pieces 9 and 10 and this shifting lever has the fork 36 thereof mounted over the toothed edge of the gear 19 so that as the lever 34 is shifted in its swinging path, it will cause the gear wheel 19 to be moved and through the fact that the shaft 11 is slidably mounted, this shaft will be moved to carry the clutch member 12 into mesh and engagement with the clutch member 8 and at the same time the cam portion 21 of the sleeve 20 will be brought into engagement with the cam portion 18 of the sleeve 17, this engagement of the cam teeth of the sleeves 20 and 17 acting to connect the ratchet wheel 14 to be rotated with the shaft. An operating rod 37 is connected with the shift lever 34 and is led to the body of the car where it may be operated by any suitable means (not being shown). A pin 38 is carried by the shifting lever 34 and a swinging member 39 is normally held in engagement with this pin by the coil spring 40. This swinging member 39 has a sloped projection 41 formed thereon and as the operating rod 37 is moved to swing the shift lever 34 into one of its operative positions, the pin 38 will ride over this projection 41 and through the action of the spring 40, will be held in a relation to prevent accidental back movement thereof. If desired, a rod 42 may be connected between the free ends of the shift lever 34 and the carbureter of the engine, and in this way the carbureter throttle will be opened as the shift lever is moved to bring the starting mechanism to the operative position.

In the operation of the device, the operating rod 37 is shifted to move the starter shaft 11 to bring the clutch portion 12 into engagement with the clutch portion 8 and at the same time the cam portions 21 of the sleeve 20 are brought to an interfitted relation with the cam portions 18 of the sleeve 17 thus connecting the parts to carry the ratchet wheel 14. The handle 33 has the members thereof swung around their hinged mountings to the relation shown in Figs. 1, 5, and 6, and then by turning the operating shaft 22 by grasping the handle 33, motion will be transmitted through the geared connection from this operating shaft 22 to the shaft 25 and through the meshing of the gears 26, 27, and 19, turning movement will be transmitted to the starter shaft 11 to cause the engine 7 to be turned in a clockwise direction through the engagement of the clutch members on this engine shaft and on the starter shaft. The ratchet wheel 14 is carried around with the starter shaft 11 and so that the parts will operate until the engine has been started, except that should the engine backfire, the ratchet wheel 14 will be held against back movement by the dogs or pawls 15, and as the starter shaft 11 is connected with the engine shaft 7 through the clutches carried thereby, this shaft 11 will be given turning movement and the cam faces 18 of the sleeve 17 will cause the cam portions of the sleeve 19 to ride up over the faces thereof and to cause the starter shaft 11 to be given endwise movement to a relation that the clutch members 12 and 8 are disengaged and thus the starter shaft 11 is released from the engine shaft 7 and no damage is done to the parts of the starter mechanism, further by arranging the parts in this manner, the backfire of the engine can not be transmitted to the starting handle 33 by which the operating shaft 22 is turned and there is no danger to the operator.

While I have herein shown and described only one form of my invention, it will be understood that other means might be provided for operating the shift lever or for shifting the starter shaft 11, that the geared drive might be arranged in various other manners, and that modifications and variations in the several parts and in the combinations of the same might be resorted to without departing from the spirit and scope of the invention, and hence I do not wish to be limited to the exact disclosure but only to such points as may be set forth in the claims.

I claim:—

1. An engine starter including a starter shaft journaled in line with the engine shaft and mounted to be capable of endwise sliding movement, clutch members carried by the engine shaft and starter shaft, a shaft extending through the steering post of the vehicle on which the engine is mounted as a power plant, a gear connection from said last mentioned shaft to the starter shaft, means by which the starter shaft is moved endwise to bring the clutch member thereof into interfitting engagement with the clutch member of the engine shaft, and a handle connected with the shaft extending through the steering post to be used in turning the shaft.

2. An engine starter comprising in combination with a vehicle having an engine mounted thereon and a steering post, a starter shaft journaled in line with the engine shaft, clutch members carried by the starter shaft and the engine shaft, a shaft extending through the steering post, a connection from said last mentioned shaft to turn the starter shaft, a handle connected with the shaft extending through the steering post to be accessible adjacent the steering wheel and to be operated to cause turning of the starter shaft to start the engine, and means mounted in conjunction with the starter shaft to disengage the clutch thereof from the clutch of the engine shaft upon back firing of the engine.

3. An engine starter comprising a starter shaft journaled in line with the engine shaft and mounted to be capable of endwise sliding movement, a clutch member carried by the starter shaft, a clutch carried by the engine shaft with which said first clutch member has engagement as the starter shaft is moved into one of its extreme positions, a ratchet wheel mounted on the starter shaft to be capable of turning movement, a gear wheel rigidly secured on said starter shaft, cam portions formed on the gear wheel and on the ratchet wheel to be brought into engagement as the clutch members are brought to the locked relation, dogs arranged for said ratchet wheel to permit the turning thereof in the direction of operation of the engine shaft and to hold the same in a stationary relation to cause the withdrawal of the starting shaft from the operative relation through the engagement of the cam portions as the engine backfires, a shifting lever arranged to be manually moved to cause the starter shaft to be thrown into and out of the operative position, a steering wheel by which the course of travel of the vehicle for which the engine forms the power plant is steered, and a starting handle mounted on the steering wheel to cause the turning of the starter shaft.

4. An engine starter comprising a starter shaft journaled in line with the engine shaft and mounted to be capable of endwise sliding movement, a steering wheel mounted on the steering post by which the course of travel of the vehicle for which the engine is a power plant is directed, a clutch member connected on the end of the engine shaft, a clutch member carried by the inner end of the starter shaft to mesh with the clutch member of the engine shaft when the starter shaft is given extreme movement in one direction, a gear wheel rigidly secured on the starter shaft, an operating shaft passed through the steering post, a driving connection from the operating shaft to said gear wheel, means by which the gear wheel may be shifted to move the starter shaft to bring the clutch members into mesh, and a folding handle connected with the operating shaft to be moved adjacent the steering wheel to cause the engine shaft to be turned through the connecting parts.

5. An engine starter comprising a starter shaft journaled in line with the engine shaft and mounted to be capable of endwise sliding movement, a steering wheel mounted on a steering post by which the course of travel of the vehicle for which the engine is a power plant is directed, a clutch member connected on the end of the engine shaft, a clutch member carried by the inner end of the starter shaft to mesh with the clutch member of the engine shaft when the starter shaft is given movement in one direction, a gear wheel rigidly secured on the starter shaft, an operating shaft passed through the steering post, a driving connection from the operating shaft to said gear wheel, means by which the gear wheel may be shifted to move the starter shaft to bring the clutch members to mesh, a folding handle connected with the operating shaft to be moved adjacent the steering wheel to cause the engine shaft to be turned through the connecting part, a ratchet wheel revolubly mounted on the starting shaft, a sleeve carried by said ratchet wheel and provided with cam faces, a sleeve mounted as a part of the gear wheel and provided with cam faces meshing with the cam faces of the sleeve of the ratchet wheel, and dogs arranged to permit operation of the ratchet wheel in a direction to start the engine and to stop rotation thereof in the direction of the backfiring of the engine and through the engagement of the cam faces to cause the starter shaft to be moved to a position that the clutch portions of the starter shaft and the engine shaft are disengaged.

6. An engine starter comprising a starter shaft journaled in line with the engine shaft and mounted to be capable of endwise sliding movement, a steering wheel mounted on a steering post by which the course of travel of the vehicle for which the engine is a power plant is directed, a clutch member connected to the end of the engine shaft, a clutch member carried by the inner end of the starter shaft to mesh with the clutch member of the engine shaft when the starter shaft is given movement in one direction, a gear wheel rigidly secured on the starter shaft, an operating shaft passed through the steering post, a driving connection from the operating shaft to said gear wheel, means by which the gear wheel may be shifted to move the starter shaft to bring the clutch members into mesh, a folding handle connected with the operating shaft to be moved adjacent the steering wheel to cause the engine shaft to be turned through the connecting part, a ratchet wheel revolubly mounted on the starting shaft, a sleeve carried by said ratchet wheel and provided with cam faces, a sleeve mounted as a part of the gear wheel and provided with cam faces meshing with the cam faces of the sleeve of the ratchet wheel, dogs arranged to permit operation of the ratchet wheel in a direction to start the engine and to stop rotation thereof in the direction of the backfiring of the engine and through the engagement of the cam faces to cause the starter shaft to be moved to a position that the clutch portions of the starter shaft and the engine shaft are disengaged, means by which the shifting lever through which the starter shaft is moved is held against accidental displacement, and means connected with the carbureter to open the throttle as the parts are shifted to the starting position.

In testimony whereof I affix my signature in presence of two witnesses.

FRANK HOFFMAN.

Witnesses:
  E. F. JONES,
  A. O. FLADSTAL.

Copies of this patent may be obtained for five cents each, by addressing the "Commissioner of Patents, Washington, D. C."